April 27, 1943.    S. A. HOLMES    2,317,769
CHAIN CONSTRUCTION
Filed Nov. 9, 1942

S. A. Holmes
INVENTOR.
BY

Patented Apr. 27, 1943

2,317,769

UNITED STATES PATENT OFFICE 2,317,769

CHAIN CONSTRUCTION

Samuel A. Holmes, Storm Lake, Iowa

Application November 9, 1942, Serial No. 465,068

4 Claims. (Cl. 74—249)

This invention relates to chain construction, and particularly to chains embodying chain links that may be readily removed and replaced when the chain breaks, eliminating the necessity of adjusting the chain for slack, in order to replace links in repairing broken chains mounted on machinery.

An important object of the invention is to provide a chain made up of a plurality of removable links, each link having means whereby links may be readily disconnected and replaced, the means for locking the links together being readily accessible so that the repair of the chain may be carried out with facility.

Another important object of the invention is to provide a chain wherein the links are exceptionally loose, with respect to each other, the construction of the links being such as to prevent twisting of the chain while in use.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

In the present showing, the chain is made up of a plurality of substantially rectangular links of the type used with combines, manure spreaders and other farm machinery wherein exceptionally strong links are required for transmitting power to machinery.

Figure 1:
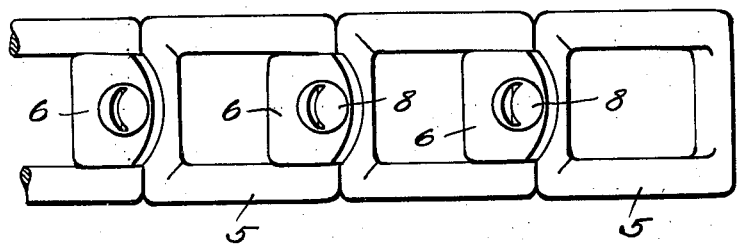
Figure 1 is a plan view of a section of a chain, constructed of links designed in accordance with the invention.
Figure 2:
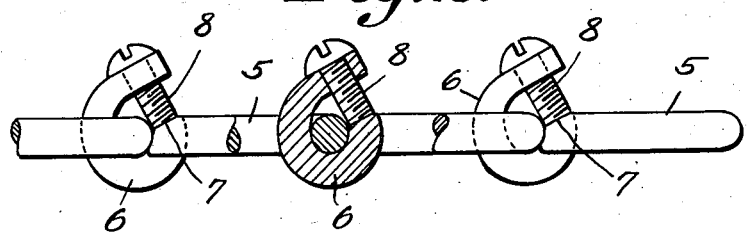
Figure 2 is a sectional view through connected links.

The links, which are indicated by the reference character 5, are each formed with an extension 6 which is curved forwardly and rearwardly, as clearly shown by Figure 2 of the drawing, the extension being of a width to fit between the side bars of the adjacent link, with which it is connected. This extension 6 is formed integrally with one of the end bars of the link, and the free end of the extension overlies the end bar of the link forming a part thereof.

The end bar of the link is flattened as at 7, providing a surface against which the screw 8 engages. The screw 8 is threaded through an opening formed in the extension which is adjacent to the free end thereof and as shown, the screw 8 is of a length to engage the flattened portion 7, when the head of the screw contacts the extension on which it is carried.

While the extension 6 is of a length to extend over the end bar of which it forms a part, it is to be understood that the extension is spaced from the end bar a distance to receive the end bar of the adjacent link of the chain, permitting the interlocking or the connecting of the links by merely placing the end bar of one link between the extension and its end bar and pulling the links away from each other. The screw is now positioned, securely locking the links together against displacement.

Figure 3:
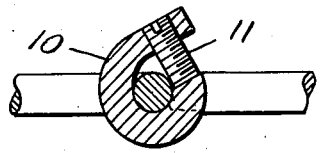
Figure 3 is a sectional view through connected links, showing a modified form of the invention.

In the form of the invention as shown by Figure 3, the extension, which is indicated by the reference character 10 also extends upwardly and overlies the end bar of which it forms a part, in spaced relation with the end bar.

In this form of the invention, the screw 11 is headless, and the outer end of the screw lies flush with the outer surface of the extension 10, to the end that no protruding parts are present in the chain construction.

From the foregoing it will be seen that due to the construction shown and described, the broken links of a chain may be readily removed and replaced, by merely unscrewing the screw and allowing the end bar of the adjacent chain link to slide through the space between the extension and its bar. This removal may be accomplished without the necessity of adjusting the chain for slack, or removing the chain from its sprocket.

It will also be noted that since the screw extends through the extension at a point substantially intermediate the side edges of the extension, the screw will act as a lock to prevent the chain links from twisting under lateral strain or pressure directed thereto, which twisting usually results in a strain which will break or distort the chain links, rendering them inoperative.

What is claimed is:

1. A chain embodying links, each link comprising connected side and end bars, an extension formed integral with one of the end bars and being extended upwardly and rearwardly over the end bar with which it is connected, in spaced relation therewith, the extension of one link adapted to fit between the side bars of the adjacent link in contact with the side bars, and a threaded member adapted to extend through the extension and engage the end bar with which it is connected, closing the space between the extension and the end bar.

2. A chain embodying links, each link comprising connected side and end members, an upwardly and rearwardly curved extension formed integral with one of the end members, in spaced relation therewith, the space between the extension and end bar being greater than the thickness of the end bar, whereby the end bar of a link may be positioned therein when links are assembled in the formation of a chain, and a threaded member carried by the extension and adapted to extend across the space between the extension and end member closing said space.

3. A chain embodying connected rectangular links, each link comprising connected side and end bars, an extension formed integral with the end bar of each link, said extension being curved upwardly and rearwardly over the end bar with which it is connected, said end bar carrying the extension having a flattened portion, said extension having a threaded opening, and a screw extending through the threaded opening and adapted to engage the flattened portion, closing the space between the extension and end bar.

4. In a chain, a plurality of links, each link comprising side and end bars, a wide extension formed integral with one of the end bars, the extension being of a width slightly less than the distance between the side bars of a link, whereby the extension may be positioned between the side bars of a link in the formation of a chain, said extension being curved upwardly and rearwardly over the end bar with which it is connected, said extension being spaced from its end bar providing a space to receive the end bar of the adjacent link of a chain, said extension having a threaded opening, and a screw extending through the threaded opening and adapted to engage the adjacent end bar closing the space between the extension and its end bar.

SAMUEL A. HOLMES.